United States Patent [19]
Tague et al.

[11] Patent Number: 4,799,181
[45] Date of Patent: Jan. 17, 1989

[54] BCD ARITHMETIC USING BINARY ARITHMETIC AND LOGICAL OPERATIONS

[75] Inventors: Steven A. Tague, Billerica; William E. Woods, Natick, both of Mass.

[73] Assignee: Honeywell Bull Inc., Minneapolis, Minn.

[21] Appl. No.: 913,810

[22] Filed: Sep. 30, 1986

[51] Int. Cl.⁴ .............................. G06F 7/38
[52] U.S. Cl. ................................ 364/736
[58] Field of Search ........... 364/756, 763, 781, 736, 364/768

[56] References Cited
U.S. PATENT DOCUMENTS

| | | | |
|---|---|---|---|
| 3,986,015 | 10/1976 | Gooding et al. | 364/738 |
| 4,001,570 | 1/1977 | Gooding et al. | 364/783 X |
| 4,384,340 | 5/1983 | Tague et al. | 364/736 |
| 4,384,341 | 5/1983 | Tague et al. | 364/763 |
| 4,390,961 | 6/1983 | Negi et al. | 364/756 |
| 4,635,220 | 1/1987 | Yabe et al. | 364/763 |

Primary Examiner—Gary V. Harkcom
Assistant Examiner—Tan V. Mai
Attorney, Agent, or Firm—George Grayson; John S. Solakian; Lewis P. Elbinger

[57] ABSTRACT

A binary arithmetic unit performs arithmetic operations on binary coded decimal (BCD) operands by converting the BCD digits to hexadecimal excess 3 digits, generating hexadecimal excess 6 partial product digits and modifying selected excess 6 partial product digits to generate a BCD result.

36 Claims, 4 Drawing Sheets

Binary System 1

ARITHMETIC AND LOGICAL OPERATION STEPS

CYCLE 1    (ADD)   $Y = Y - CCCD_H$      $Y = CCCD_H - Y - 1$   (SUBT)

2      $X = X - CCCD_H$

3      $Q = X + Y$    $+1$

4      $X = X \text{ OR } Y$    R8 OR S8

5      $Y = 2 \times Q$    T4

6      $Y = 2(Y \text{ OR } Q)$    T4 OR T2

7      $H = Y \text{ AND } Q$    T8T4 OR T8T2

8      $Y = \dfrac{(X \text{ AND } \overline{H})}{2}$    4 BIT = (R8 OR S8) AND $\overline{\text{T8T4 OR T8T2}}$ 9      $H = Y \text{ OR } BBBB_H$
         $Y = \dfrac{Y \text{ OR } BBBB_H}{2}$ 10     $Y = Y \text{ AND } H$

|  |  | ADDITION<br>5678 R<br>+1987 S<br>7665 |  |  |  | SUBTRACTION<br>5678 R<br>-1987 S<br>3691 |  |  |  |
|---|---|---|---|---|---|---|---|---|---|
| LOCATION L1<br>DECIMAL | | 0101<br>5 | 0110<br>6 | 0111<br>7 | 1000<br>8 | | | | |
| LOCATION L2<br>DECIMAL | | 0001<br>1 | 1001<br>9 | 1000<br>8 | 0111<br>7 | | | | |
| LITERAL<br>HEX | | 1100<br>C | 1100<br>C | 1100<br>C | 1101<br>D | | | | |
| CYCLE 1 | L2<br>HEX | 0100<br>4 | 1100<br>C | 1011<br>B | 1010<br>A | 1011<br>B | 0011<br>3 | 0100<br>4 | 0101<br>5 |
| CYCLE 2 | L1<br>HEX | 1000<br>8 | 1001<br>9 | 1010<br>A | 1011<br>B | 1000<br>8 | 1001<br>9 | 1010<br>A | 1011<br>B |
| CYCLE 3 | Q<br>HEX | 1101<br>D | 0110<br>6 | 0110<br>6 | 0101<br>5 | 0011<br>3 | 1100<br>C | 1111<br>F | 0001<br>1 |
| CYCLE 4 | L1<br>HEX | 1100<br>C | 1101<br>D | 1011<br>B | 1011<br>B | 1011<br>B | 1011<br>B | 1110<br>E | 1111<br>F |
| CYCLE 5 | L2<br>HEX | 1010<br>A | 1100<br>C | 1100<br>C | 1010<br>A | 0111<br>7 | 1001<br>9 | 1110<br>E | 0010<br>2 |
| CYCLE 6 | L2∨Q<br>L2<br>HEX | 1111<br>1111<br>F | 1110<br>1101<br>D | 1110<br>1101<br>D | 1111<br>1110<br>E | 0111<br>1111<br>F | 1101<br>1011<br>B | 1111<br>1110<br>E | 0011<br>0110<br>6 |
| CYCLE 7 | H | 1101<br>D | 0100<br>4 | 0100<br>4 | 0100<br>4 | 0011<br>3 | 1000<br>8 | 1110<br>E | 0000<br>0 |
| CYCLE 8 | H̄<br>L1∧H̄<br>L2 | 0010<br>0000<br>①000<br>8 | 1011<br>1001<br>0100<br>4 | 1011<br>1011<br>1101<br>D | 1011<br>101①<br>1101<br>D | 1100<br>1000<br>1100<br>C | 0111<br>1011<br>0001<br>1 | 0001<br>0000<br>1000<br>8 | 1111<br>1111<br>0111<br>7 |
| CYCLE 9 | LITERAL<br>H<br>L2 | 1011<br>B<br>1011<br>B<br>①101<br>D̄ | 1011<br>B<br>1111<br>F̄ | 1011<br>B<br>1111<br>F̄ | 1011<br>B<br>111①<br>F̄ | 1011<br>B<br>1111<br>F<br>①111<br>F̄ | 1011<br>B<br>1011<br>B<br>1101<br>D̄ | 1011<br>B<br>1011<br>B<br>1101<br>D̄ | 1011<br>B<br>111①<br>F<br>1111<br>F̄ |
| CYCLE 10 | L2 | 1001<br>9 | 1111<br>F̄ | 1111<br>F̄ | 1111<br>F̄ | 1111<br>F̄ | 1001<br>9 | 1001<br>9 | 1111<br>F̄ |
| CYCLE 11 | L1<br>DECIMAL | 0111<br>7 | 0110<br>6 | 0110<br>6 | 0101<br>5 | 0011<br>3 | 0110<br>6 | 1001<br>9 | 0001<br>1 |

BCD ARITHMETIC USING BINARY ARITHMETIC AND LOGICAL OPERATIONS

BACKGROUND OF THE INVENTION

1. Field of the Invention

This invention relates generally to the field of data processing and more particularly to binary coded decimal arithmetic operations performed by binary apparatus.

2. Description of the Prior Art

Data processing systems execute arithmetic and logical instructions. These instructions call for operands having different characteristics. Operands may include, typically, binary words of various bit lengths, bytes, ASCII characters, 4-bit digits, 6-bit digits, and binary coded decimal digits. The digit operands may be packed or unpacked, and include or not include zone bits.

A data processing system may be designed to perform arithmetic operations on one or more types of operands by using arithmetic units and switches of varying complexities with resulting increased cost. Some data processing systems are designed for just binary arithmetic; others are designed to process bytes or binary coded decimal operands. Cost and efficiency of operation are always a factor in determining the characteristics of the hardware to execute arithmetic and logical operations on types of operands.

OBJECT OF THE INVENTION

Accordingly, it is an object of the present invention to provide a system to process both binary and binary coded decimal operands by using a binary arithmetic unit.

SUMMMARY OF THE INVENTION

An N bit binary arithmetic unit includes a register file for storing operands, a binary arithmetic logic unit for performing logical and arithmetic operations on the operands and generating a result, a shifter for receiving the result and storing it back in the register file shifted one bit left, one bit right or not shifted at all, a Q register for storing a partial result, a literal data source and an H register for intermediate processing.

Binary coded decimal (BCD) operands stored in the register file are converted to hexadecimal excess 3 digits and added together in the binary arithmetic logic unit to form a partial result which is stored in the Q register. Each digit of the partial result may be in BCD final result form or in hexadecimal excess 6 form.

The hexadecimal excess 3 operands and the partial result digits are examined to determine whether a carry resulted out of the corresponding digit positions during the arithmetic operation. If a carry resulted in the corresponding digit position, then the corresponding hexadecimal partial result digit is a BCD final result digit. If no carry resulted during the arithmetic operation, then the corresponding hexadecimal partial result digit is in excess 6 form and a correction is made to generate the corresponding BCD digit of the final result digit.

BRIEF DESCRIPTION OF THE DRAWINGS

The manner in which the method of the present invention is performed and the manner in which the apparatus of the present invention is constructed and its mode of operation can best be understood in light of the following detailed description together with the accompanying drawings in which like reference numbers identify like elements in the several figures and in which:

FIG. 3 shows a flow diagram of the logical and arithmetic operations of the invention.

FIG. 4 shows arithmetic addition and subtraction examples.

DESCRIPTION OF THE PREFERRED EMBODIMENT

Figure 1:
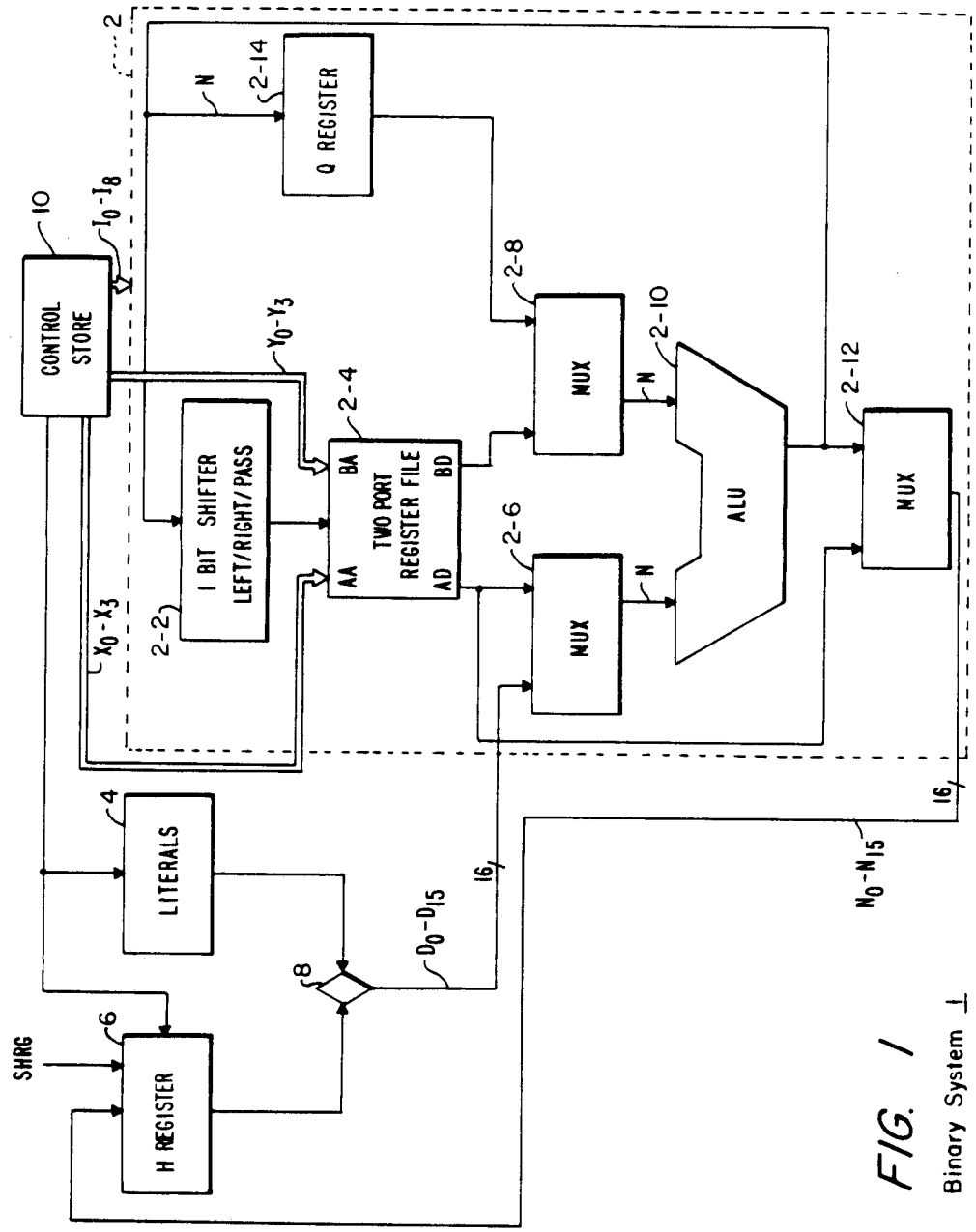
FIG. 1 shows an overall block diagram of the elements of the invention.

FIG. 1 shows the elements of a binary system 1 which receives binary coded decimal (BCD) operands, performs a logic or arithmetic operation, and generates a BCD result. The elements include a microprocessor 2 which performs binary arithmetic and binary logical operations, a binary H register 6 and a source 4 for storing literals received from a control store 10.

Microprocessor 2 is typically made up of a number of AM 2901C 4-bit bipolar microprocessor slices which are described in the Advanced Micro Devices—Bipolar Microprocessor Logic and Interface Data Book 1981.

Any number of AM 2901C slices may be used with this invention. For simplicity of description, four AM 2901C slices are described which process a 16-bit binary word, however, this invention is not limited to the 16-bit binary word and may be used to process any size binary word, typically, 24, 32, 48, 64 or 72 bit binary words or greater.

The following elements of microprocessor 2 are used in the execution of the invention. A two port register file 2-4 stores the operands R and S in BCD form, as well as the results of intermediate arithmetic and logical operations. The register file 2-4 typically holds 16 operands, but this invention requires only 2 distinct locations, one for storing operand R and the other for storing operand S. Also, the result of subsequent operations are stored in one of these locations.

An arithmetic logic unit (ALU) 2-10 performs binary arithmetic and binary logical operations on operands received via a multiplexer 2-8 from a Q register 14 or the register file 2-4 as well as operands received via a MUX 2-6 from register file 2-4 or from a wired OR connection 8 which couples source 4 or register 6 to MUX 2-6.

The Q register 2-14 stores the first pass of the BCD result which is subsequently modified and the final BCD result is stored back in register file 2-4.

A one place shifter 2-2 shifts operands received from the ALU 2-10 one bit to the right to divide by two, or one bit to the left to multiply by two or passes the operands to register file 2-4 with no shift.

A MUX 2-12 transfers an operand from register file 2-4 or from ALU 2-10 to register 6 during intermediate calculations. Register file 2-4 is addressed by signals X0 through X3 and signals Y0 through Y3 applied to terminals AA and BA respectively from control store 10. The nine signals I0 through I8 from control store 10 control the flow of the operands through the microprocessor 2 elements. Control store 10 bits determine carry-in generation, carry-out saving, loading H, register 6 and literal source 4, selecting between H and register 6 and literal source 4, and shift end effects.

Figure 2:
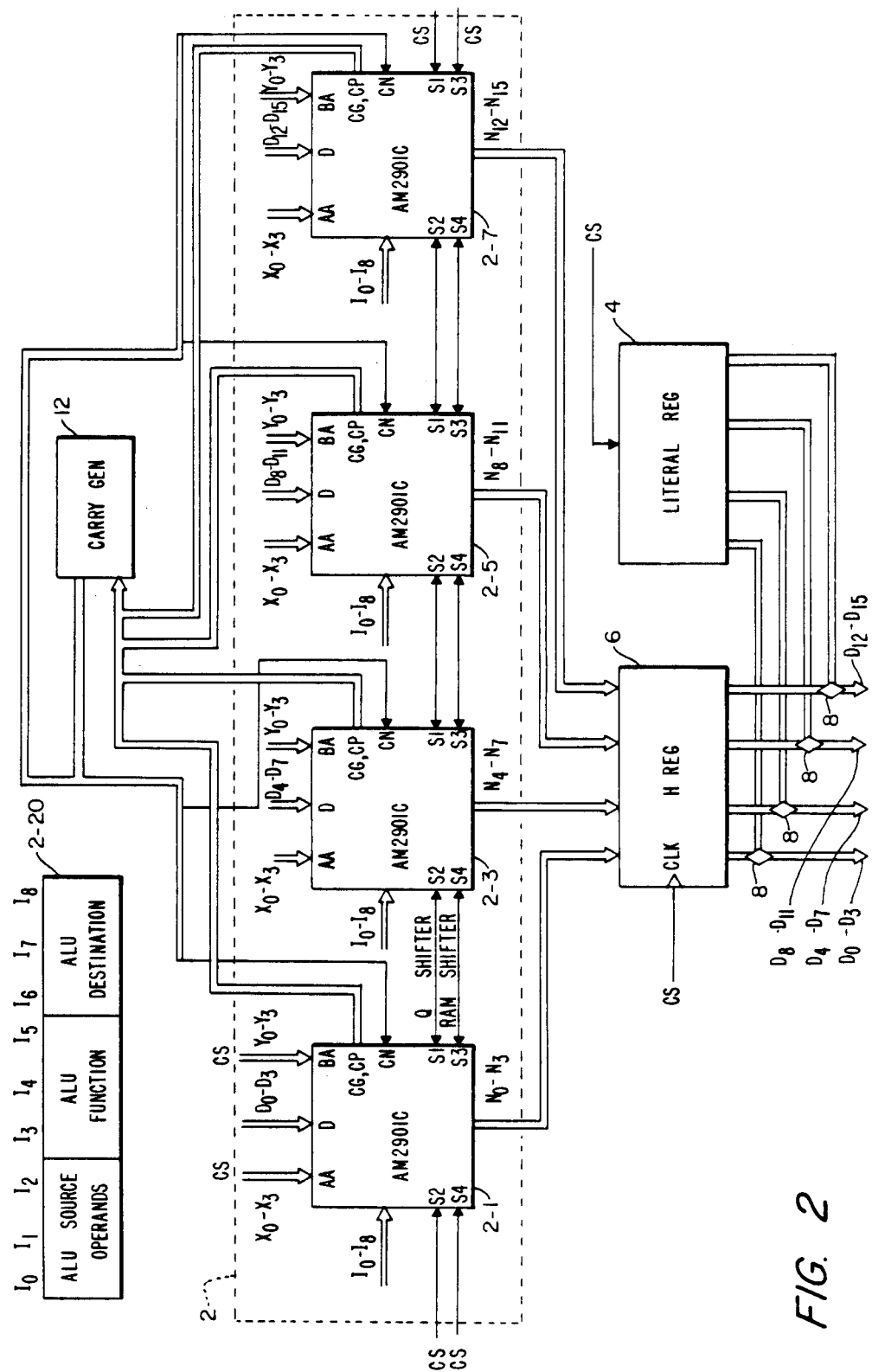
FIG. 2 shows a more detailed block diagram of the elements of the invention.

Referring to FIG. 2, block 2-20 shows the microprocessor 2 functions that signals I0 through I8 control.

Signals I0, I1 and I2 specify the source of the operands. For example, signal I0 high and signals I1 and I2 low specify that one operand will be read from register file 2-4 at a location specified by the address signals X0 through X3 and the other operand will be read from register file 2-4 at a location specified by address signals Y0 through Y3.

Signals I3, I4 and I5 specify the operation the ALU 2-10 will perform on the two operands. For example, signals I3, I4 and I5 low will result in ALU 2-10 adding binary operands R and S together.

Signals I6, I7 and I8 specify where the result is stored. For example, if signals I6 and I7 are high and signal I8 is low, then the output signals of ALU 2-10 are stored in the location in register file 2-4 specified by address signals Y0 through Y3.

Referring to FIG. 2, four microprocessors 2-1, 2-3, 2-5 and 2-7 are coupled to form a 16-bit microprocessor 2. Terminals S1 and S2 are coupled to allow information to shift one bit right, one bit left or not shift at all, for storage in the Q register 2-14. Similarly, terminals S3 and S4 are coupled to perform the function of the one bit shifter 2-2 by allowing information from ALU 2-10 to shift one place left, one place right or not shift at all for storage in register file 2-4. Terminals S1 and S3 of microprocessor 2-7 are coupled to control store 10 as are terminals S2 and S4 of microprocessor 2-11. This permits firmware to specify a closed shift operation or to direct the register file 2-4 and the Q register 2-14 to perform as a 32 bit binary register.

Signals X0 through X3 are applied to their respective address terminals AA of register file 2-4. Signals Y0 through Y3 are applied to their respective address terminals BA of register file 2-4. Microprocessor 2 output signals N0 through N15 are applied to H register 6. Data signals D0 through D15 from wired OR connections 8 are applied to the respective data D terminals of microprocessors 2-1, 2-3, 2-5 and 2-7, respectively. Also, a number of signals identified as CS are received from control store 10 to control the contents and timing of literal source 4 and H register 6.

A carry generator 12 receives carry generation CG signals and carry propagation CP signals from each microprocessor 2 to generate high-speed carry signals CN.

FIG. 3 is a block diagram showing the arithmetic and logical steps of the BCD arithmetic operation using binary elements. The eleven cycles may be considered as performing three functions. Cycles 1 and 2 convert the two BCD operands upon which the arithmetic operation is performed into excess 3 form. Cycle 3 performs binary addition of the operands in excess 3 form. This gives a result in excess 6 form. Cycles 4 through 11 convert the result to BCD by subtracting six from only those digit positions out of which there was no carry into the next digit position during cycle 3. R8 and S8 refer to the excess 3 version of the input operands, and T refers to the partial result.

Initially, literal register 4 is loaded with hexadecimal CCCD (binary 1100 1100 1100 1101) from control store 10. Using hexadecimal CCCD allows the use of the same value for placing the operands in excess 3 form for both the addition and the subtraction operation. Also initially, operand R is stored in a location L1 and operand S is stored in a location L2 of register file 2-4.

For the arithmetic operation, BCD operand R from location L1 is added to BCD operand S from location L2 and the BCD final result is to be stored in location L1. During cycle 1, signals I0 through I2 cause the value of the literal 4, hexadecimal CCCD, to be applied to ALU 2-10 via wired OR connectors 8, signals D0 through D15, and MUX 2-6. Also, location L2 of register file 2-4 is addressed by signals Y0 through Y3 to apply the BCD operand S to ALU 2-10 via MUX 2-8. The ALU 2-10 is responsive to signals I3 through I5 to subtract hexadecimal CCCD from operand S. Note that subtracting hexadecimal CCCD gives the same excess 3 result as adding hexadecimal 3333. Signals I6 through I8 store the hexadecimal excess 3 result back into location L2 via shifter 2-2 which is in the no-shift mode.

Cycle 2 operates in a similar manner. The value of literal 4, hexadecimal CCCD, is subtracted from operand R from location L1 and stores the hexadecimal excess 3 result back into location L1 of register file 2-4.

Prior art systems would normally place one operand in excess 6 form and leave the other operand in BCD form. This invention, which places each operand in excess 3 form, reduces the number of cycles required later and allows a common constant value, hexadecimal CCCD, for both the addition and subtraction arithmetic operation.

During cycle 3, the contents of locations L1 and L2 are applied to the ALU 2-10 via MUX's 2-6 and 2-8, respectively, added and the result stored in register Q 2-14. It is understood that each cycle is executed under control of signals I0 through I8, therefore, the description of each cycle operation is not repeated.

The contents of Q register 2-14 represents a partial result containing some BCD digits of the final result and some excess 6 digits. The difference depends on whether or not a carry out from that digit position to the next higher digit position resulted. If a carry out of a digit position occurred, then that digit position contains a BCD digit of the final result; otherwise, the digit position contains a hexadecimal excess 6 digit.

Cycles 4 through 10 examine the various combinations of bits in each decimal digit of the two excess 3 operands and of the partial result to determine whether a carry out of a lower order hexadecimal digit position into a next higher order digit position occurred. This avoids the requirement for special hardware to remember the carries.

The results of cycles 4 through 10 determine the hexadecimal digit values to be added to the contents of Q register 2-14 for the excess 6 correction.

The correction is accomplished during cycle 11 to give the final BCD result of the addition of operands R and S.

During cycle 4, the contents of locations L1 and L2 are applied to ALU 2-10 to perform a logic OR operation and the result stored in location L1. Subsequently, the "8-bit" of each digit position in the result of this cycle is examined. The "8-bit", if binary ZERO, indicates that there was no possible carry out of that digit position as a result of cycle 3 since both original operand digits had to be less than five in BCD. The "8-bit[, if binary ONE, indicates the possibility of a carry out of that digit position, that is, at least one original BCD digit in the corresponding digit position had a value of five or greater.

During cycle five, the contents of the Q register 2-14 is shifted one position left by shifter 2-2 and stored in location L2. This moves the "2-bit" of each hexadecimal digit of the partial result into the "4-bit" position of that hexadecimal digit thereby lining up the "2 bits" of the partial answer with the "4 bits" of the partial answer.

During cycle 6, the contents of location L2 is OR'ed with the contents of the Q register 2-14, the result shifted left one bit position by shifter 2-2 and stored in location L2. The resulting "8-bit" for each digit position in L2 is at binary ONE if either the "bit 2" or "bit 4" in the corresponding digit position of the partial rresult is at binary ONE.

During cycle 7, the contents of location L2 is AND'ed with the contents of the Q register 2-14 and the result is stored in the H register 6. An examination of the "8 bit" in each digit position will now show whether or not the corresponding digit position of the partial result stored in Q register 2-14 is greater than hexadecimal 9.

During cycle 8, the "4 bit" for each digit position in the correction value is determined by complementing the contents of the H register 6, AND'ing it with the contents of location L1, shifting the result one position to the right and storing the result in location L2. The resulting "4 bits" in L2 are at binary ZERO if the corresponding partial result digit is in excess 6 form and requires correction.

The boolean equation for the result of cycle 8

$$4 \text{ bit} = (R8 \text{ OR } S8) \overline{(T8T4 \text{ OR } T8T2)}$$

indicates the following. For the "4 bit" to be at logical ONE indicating that there was a carry out of that corresponding digit position, then the corresponding digit of at least one of the BCD operands had to have a decimal 5 or greater and the partial result digit in the Q register 2-14 had to be nine or less.

The 4 bit is at binary ZERO indicating that there was no carry out of that corresponding digit position if neither corresponding BCD operand digit had a five or if greater or the corresponding partial product digit was greater than 9.

During cycle 9, the indication for the need for excess 6 correction stored in the "4 bit" of each digit position of location L2 are extracted by generating hexadecimal BBBB (1011 1011 1011 1011) from literal source 4 and OR'ing it with the contents of location L2. The resulting digits, hexadecimal B or F, are stored in H register 6, simultaneously shifted right one bit position and stored in location L2. Control store 10 forces a binary ONE into the most significant bit position so that for the digit positions corresponding to the hexadecimal B's in H register 6, there are hexadecimal D's stored in location L2 and hexadecimal F's stored in the remaining digit positions.

During cycle 10, the contents of location L2 and the contents of the H register 6 are AND'ed and the result which is stored back in location L2 is the factor which is added to the contents of the Q register 2-14 to give the BCD result.

Each digit position in location L2 contains either a hexadecimal 9 or a hexadecimal F. The presence of the hexadecimal 9 indicates a digit position in which the partial result is in excess 6 form while the hexadecimal F indicates a digit position having the partial result in BCD form. In the preferred embodiment, it requires fewer cycles to generate the correction values of hexadecimal 9's and F's which are added than a patern of hexadecimal 0's and 6's which are subtracted. Note that the hexadecimal 9's and F's are the ones' complement of the normally expected hexadecimal 0's and 6's.

During cycle 11, the contents of location L2 are added to the contents of the Q register 2-14, plus binary ONE, to give the BCD result of the addition. Adding a binary ONE and the ones complement of a number is equivalent to subtracting that number. (Note that if a digit position resulted in a carry to the next digit higher position, the result was greater than hexadecimal F, but less than hexadecimal F plus ten.)

For the subtraction operation, cycle 1 subtracts operand S from location L2 from hexadecimal CCCD minus binary ONE. This stores the 9's complement of operand S in excess 3 form in location L2 and converts the problem to one of addition. Also, a binary ONE is added to the total in step 3 to generate the partial result in Q register 2-14.

FIG. 4 shows an addition and a subtraction example using the method and apparatus as described in FIG. 3.

For the addition example, operand R, BCD 5678 in location L1 is added to operand S, BCD 1987 in location L2, and the result of BCD 7665 is stored back in location L1. Hexadecimal CCCD is supplied by literal source 4.

During cycle 1, operand S is placed in excess 3 form by subtracting hexadecimal CCCD from BCD 1987 and the result, hexadecimal 4CBA, is stored in location L2.

Similarly, during cycle 2 operand R is placed in excess 3 form by subtracting hexadecimal CCCD from BCD 5678 and the result, hexadecimal 89AB, is stored in location L1.

Cycle 3 adds hexadecimal 4CBA from location L2 and hexadecimal 89AB from location L1 and stores the result, hexadecimal D665, in register Q 2-14 as the partial result. Note that there was a carry out of the three low order digit positions and no carry out of the high order digit positions. Therefore, the high order digit hexadecimal D is in excess 6 form and the remaining digits 665 are in BCD form. During cycle 4, hexadecimal 4CBA from location L2 is OR'ed with hexadecimal 89AB from location L1 and the result, hexadecimal CDBB, is stored in location L1. All of the "8" bits being binary ONE indicates that a carry could have resulted out of each digit position.

During cycle 5, hexadecimal D665 from Q register 2-14 is shifted one position left and the result, hexadecimal ACCA, is stored in location L2. This places the "2 bits" of Q register 2-14 into the 4-bit positions of location L2.

During cycle 6, hexadecimal D665 from Q register 2-14 is OR'ed with hexadecimal ACCA from location L2, the result shifted one bit position left and stored in location L2 as hexadecimal FDDE. The "8 bits", all being binary ONE, indicates that each digit position of the partial result in Q register 2-14 has a "two-bit" or a "four bit".

Cycle 7 AND's hexadecimal D665 from Q register 2-14 with hexadecimal FDDE from location L2 and the result, hexadecimal D444, stored in H register 6. The 8-bit being binary ONE in the high order digit position and binary ZERO's in the remaining digit positions show that only the high order digit position in the partial result has both an 8-bit and a 2-bit or 4-bit. In this case, the hexadecimal D in the high order digit position of the Q register 2-14 has an "8 bit" and a "4 bit".

During cycle 8, the complement of H register 2-6, hexadecimal 2BBB, is AND'ed with hexadecimal CDBB from location L1. The result, hexadecimal 09BB is shifted one bit position right to generate hexadecimal 84DD and stored in location L2. The condition of the "4 bit" being binary ZERO in the high order digit location indicates that this digit is in the excess 6 mode whereas the binary "4 bits" being binary ONE in the remaining digit positions indicate that those digits are in the BCD mode.

During cycle 9, hexadecimal 84DD from location L2 is OR'ed with hexadecimal BBBB from source 4 to generate hexadecimal BFFF which is stored in the H register 6. Shifting hexadecimal BFFF one position right generates hexadecimal DFFF which is stored in location L2.

During cycle 10, hexadecimal BFFF and hexadecimal DFFF are AND'ed to generate hexadecimal 9FFF which is stored in location L2.

During cycle 11, hexadecimal 9FFF, plus ONE, plus hexadecimal D665 from Q register 2-14 gives the final result of 7665 which is stored in location L1. Adding hexadecimal 9 at any digit position converts that digit position from excess 6 to BCD mode.

For the subtraction operation, during cycle 1 the complement of operand S in location L2 is generated by subtracting 1987 in BCD from hexadecimal CCCD and also subtracting binary ONE. The result, hexadecimal B345, in excess 3 form, is stored in location Y.

Again, cycle 2 converts operand R to excess 3 form as hexadecimal 89AB.

Cycle 3 adds the contents of locations L1 and L2 plus 1 and stores the result, hexadecimal 3CF1 in the Q register 2-14. Note that there were carries out of the high and low order digit positions and no carry out of the middle two digit positions. Therefore, the digits 1 and 3 are in BCD mode and digits C and F are in the excess 6 mode.

During cycle 4, the contents of locations L1 and L2 are OR'ed and the result, hexadecimal BBEF, is stored in location L1. The 8 bits, all being binary ONE, indicates that each digit position of the operands R and S in excess 3 mode has at least one "8 bit".

During cycle 5, the "2 bits" of each digit position of the contents of Q register 2-14 are shifted into the corresponding 4-bit positions and the result, hexadecimal 79E2, is stored in location L2.

Cycle 6 OR's the contents of the Q register 2-14 with the contents of location L2 to generate hexadecimal 7DF3. This is shifted one bit position left and hexadecimal FBE6 is stored in location L2. The "8 bit", being binary ZERO, indicates that only the low order digit of Q register 2-14 did not have either a "2 bit" or a "4 bit".

During cycle 7, the contents of locations L2 and of Q register 2-14 are AND'ed. The result, hexadecimal 38E0 is stored in the H register 6. The "8 bits", being binary ONE, indicate that only the two middle digits of Q register 2-14 had both an 8 bit, and either a 2 bit or a 4 bit.

During cycle 8, the contents of H register 6 is complemented to generate hexadecimal C71F which is AND'ed with the contents of L1 to give hexadecimal 830F. Shifting hexadecimal 830F one bit position right generates hexadecimal C187 which is stored in location L2. The two middle digit positions having the "4 bits" equal to binary ZERO indicates that the digits in those positions are in excess 6 form. The most and least significant digits are in BCD form. During cycle 9, the contents of location L2 are OR'ed with hexadecimal BBBB to generate hexadecimal FBBF which is stored in the H register 6. At the same time, there is a 1 bit right shift to generate hexadecimal FDDF which is stored in location L2.

Cycle 10 AND's hexadecimal FDDF and FDDF to generate hexadecimal F99F which is stored in location L2. Hexadecimal F will be added to those digit positions already in BCD mode and hexadecimal 9 will be added to those digit positions that are in excess 6 mode.

During cycle 11, the partial result in register Q, hexadecimal 3CF1 is added to hexadecimal F99F to give 3690. Adding binary ONE gives the BCD result of 3691 which is stored in location L1.

It is obvious to use the method and apparatus of this invention to perform the multiplication and division operations on BCD operands using successive BCD addition and BCD subtraction, respectively.

While the invention has been shown and described with reference to the preferred embodiment thereof, it will be understood by those skilled in the art that the above and other changes in form and detail may be made therein without departing from the spirit and scope of the invention.

What is claimed is:

1. A method of performing an arithmetic operation on binary coded decimal operands, the method including the steps of:
   A. converting each BCD digit of a first operand to a hexadecimal excess 3 digit to form a second operand;
   B. converting each BCD digit of a third operand to a hexadecimal excess 3 digit to form a fourth operand;
   C. adding corresponding digits of said second operand and said fourth operand to form a fifth operand specifying a partial result;
   D. determining whether a carry resulted from each digit position into a next higher order digit position during step C;
   E. forming a sixth operand having a first hexadecimal digit value in said each digit position out of which said carry in a first state resulted and having a second hexadecimal digit value in said each digit position out of which said carry in a second state resulted; and
   F. adding said fifth operand and said sixth operand and a binary ONE to form a seventh operand specifying a final result of said arithmetic operation.

2. The method of claim 1 wherein the step of determining whether a carry resulted and the step of forming a sixth operand include the steps of:
   A. ORing said second operand and said fourth operand to form an eighth operand;
   B. shifting said fifth operand one bit position left, thereby performing a binary multiplication by two, to form a ninth operand;
   C. ORing said fifth operand and said ninth operand and shifting the result one bit position left to form a tenth operand;
   D. ANDing said fifth operand and said tenth operand to form an eleventh operand;
   E. ANDing said eighth operand and a complement of said eleventh operand, shifting the result one bit position right to form a twelfth operand;
   F. ORing said twelfth operand with a predetermined constant to form a thirteenth operand and shifting said thirteenth operand one bit position right to form a fourteenth operand; and
   G. ANDing said thirteenth operand and said fourteenth operand to form said sixth operand.

3. The method of claim 2 wherein said fifth operand generated in step C includes hexadecimal excess 6 digits and BCD final result digits.

4. The method of claim 3 wherein said first hexadecimal digit of said sixth operand is a hexadecimal F and said second hexadecimal digit of said sixth operand is a hexadecimal 9.

5. The method of claim 4 wherein the addition of said binary ONE, said hexadecimal F to each of said BCD final result digits and hexadecimal 9 to each of said excess 6 hexadecimal digits generates said seventh operand.

6. The method of claim 1 whrein said arithmetic operation of steps A through F is an addition operation.

7. A method of performing an arithmetic operation on binary coded decimal operands, the method including the steps of:
  A. converting each BCD digit of a first operand to a hexadecimal excess 3 digit to form a second operand;
  B. converting the complement of each BCD digit of a third operand to a hexadecimal excess 3 digit to form a fourth operand;
  C. adding corresponding digits of said second operand and said fourth operand to form a result and adding binary ONE to said result to form a fifth operand specifying a partial result;
  D. determining whether a carry resulted from each digit position into a next higher order digit position during step C;
  E. forming a sixth operand having a first hexadecimal digit value in said each digit position out of which said carry in a first state resulted and having a second hexadecimal digit value in said each digit position out of which said carry in a second state resulted; and
  F. adding said fifth operand and said sixth operand and a binary ONE to form a seventh operand specifying a final result of said arithmetic operation.

8. The method of claim 7 wherein the step of determining whether a carry resulted and the step of forming a sixth operand include the steps of:
  A. ORing said second operand and said fourth operand to form an eighth operand;
  B. shifting said fifth operand one bit position left, thereby performing a binary multiplication by two, to form a ninth operand;
  C. ORing said fifth operand and said ninth operand and shifting the result one bit position left to form a tenth operand;
  D. ANDing said fifth operand and said tenth operand to form an eleventh operand;
  E. ANDing said eighth operand and a complement of said eleventh operand, shifting the result one bit position right to form a twelfth operand;
  F. ORing said twelfth operand with a predetermined constant to form a thirteenth operand and shifting said thirteenth operand one bit position right to form a fourteenth operand; and
  G. ANDing said thirteenth operand and said fourteenth operand to form said sixth operand.

9. The method of claim 8 whrein said fifth operand generated in step C includes hexadecimal excess 6 digits and BCD final result digits.

10. The method of claim 9 wherein said first hexadecimal digit of said sixth operand is a hexadecimal F and said second hexadecimal digit of said sixth operand is a hexadecimal 9.

11. The method of claim 10 wherein the addition of said binary ONE, said hexadecimal F to each of said BCD final result digits and hexadecimal 9 to each of said excess 6 hexadecimal digits generates said seventh operand.

12. The method of claim 7 wherein said arithmetic operation of steps A through F is a subtraction operation.

13. Apparatus for performing an arithmetic operation on binary coded decimal (BCD) operands comprising:
  a control store for generating control signals, address signals and operands;
  first means coupled to said control store and responsive to said control signals, said address signals and a first of said operands for converting each digit of a first BCD operand and a second BCD operand to a hexadecimal excess 3 digit to form a second operand and a third operand respectively;
  second means coupled to said control store and said first means and responsive to said control signals and said address signals for adding corresponding hexadecimal excess 3 digits of said second and said third operands to generate a partial result;
  third means coupled to said control store and said first and said second means and responsive to said control signals and said address signals for generating a first hexadecimal digit value in each digit position from which a carry resulted from the addition of said second and said third operands and generating a second hexadecimal digit value in each digit position from which no carry resulted; and
  fourth means coupled to said control store, said second means and said third means and responsive to said control signals and said address signals for adding said first and said second hexadecimal digit values to corresponding digit positions of said partial result and adding binary ONE to generate a final result.

14. The apparatus of claim 13 wherein said first means comprises:
  a first register means coupled to said control store for storing said first operand having a value of hexadecimal CCCD; and
  a microprocessor means including;
    a register file means coupled to said control store and responsive to first control signals and said address signal for reading out said first BCD operand and said second BCD operand on a first cycle of operation and a second cycle of operation respectively;
    an arithmetic logic unit (ALU) means coupled to said register file means, said control store and said first register means and responsive to second control signals for subtracting hexadecimal CCCD from said first BCD operand during said first cycle of operation and subtracting hexadecimal CCCD from said second BCD operand during said second cycle of operation, thus generating said second operand and said third operand;
    said register file means being coupled to said ALU means and responsive to third control signals and said address signals for storing said second operand on said first cycle of operation and said third operand on said second cycle of operation.

15. The apparatus of claim 14, wherein said second means comprises:

said register file means responsive to said first control signals and said address signals for reading out said second operand and said third operand during a third cycle of operation;

said ALU means responsive to said secnd control signals for adding said second operand and said third operand and generating said partial result; and said microprocessor means further including a second register means coupled to said ALU means and responsive to said third control signal for storing said partial result.

16. The apparatus of claim 15 wherein said third means comprises;

said register file means responsive to said first control signals and said address signals for reading out said second operand and said third operand during a fourth cycle of operation;

said ALU means responsive to said second control signals for ORing said second and said third operands and generating a fourth operand; and said register file means being responsive to said third control signals for storing said fourth operand wherein the 8-bit of each digit of said fourth operand indicates the possibility of a carry out of that digit position.

17. The apparatus of claim 16 wherein said third means further comprises:

said second register means responsive to said first control signals for reading out said partial result during a fifth cycle of operation;

said ALU means responsive to said second signals for reading said partial result operand;

said microprocessor including shifter means coupled to said ALU means and said register file means and responsive to said third control signals for shifting said partial result one bit position left to generate a fifth operand; and said register file means responsive to said third control signals and said address signals for storing said fifth operand thereby moving the 2-bit of each digit of said fifth operand in line with the 4-bit of each digit of said fourth operand.

18. The apparatus of claim 17 wherein said third means further comprises:

said register file means responsive to said address signals and said first means responsive to said first control signals for reading out said fifth operand and said partial result, respectively, during a sixth cycle of operation;

said ALU means responsive to said second control signals for ORing said partial result and said fifth operands and generating a sixth operand;

said shifter means responsive to said third control signals for shifting said sixth operand one bit position left and generating a seventh operand; and said register file means responsive to said address signals and said third control signals for storing said seventh operand wherein the 8-bit of each digit is at binary ONE if the 2-bit or the 4-bit of the corresponding digit positions of said partial result is at binary ONE.

19. The apparatus of claim 18 wherein said third means further comprises:

said register file means responsive to said address signals and said first control signals and said second register means responsive to said first control signals for reading out said seventh operand and said partial result during a seventh cycle of operation;

said ALU means responsive to said second signals for ANDing said partial result and said seventh operand and generating an eighth operand; and a third register means coupled to said ALU means and responsive to said third signals for storing said eighth operand, wherein the 8-bit of each digit of said eighth operand being binary ONE indicates that the corresponding partial result digit is greater than hexadecimal 9.

20. The apparatus of claim 19 wherein said third means further comprises:

said register file means responsive to said address signals and said first control signals and said third register means responsive to said first control signals for reading out said fourth and said eighth operands during an eighth cycle of operation;

said ALU means responsive to said second control signals for ANDing said fourth operand with the complement of said eighth operand to generate a ninth operand;

said shifter means responsive to said third control signals for shifting said ninth operand one bit position right to generate a tenth operand; and said register file means responsive to said address signals and said third control signals for storing said tenth operand wherein the four-bit of each digit position of said tenth operand being binary ONE indicates a carry out of the corresponding digit position during the third cycle of operation.

21. The apparatus of claim 20 wherein said third means further comprises:

said first register means storing hexadecimal BBBB for said control store;

said register file means responsive to said address signals and said first control signals for reading out said tenth operand during a ninth cycle of operation;

said ALU means responsive to said second control signals for ORing said tenth operand and hexadecimal BBBB to generate an eleventh operand;

said third register means responsive to said third control signals for storing said eleventh operand;

said shifter means responsive to said third control signals for shifting said eleventh operand one bit position right to generate a twelfth operand; and said register file means responsive to said address signals and said third control signals for storing said twelfth operand wherein said eleventh operand contains a hexadecimal B in each digit position out of which there was no carry and a hexadecimal F in each digit position out of which there was a carry during the third cycle of operation and said twelfth operand containing a hexadecimal D in each digit position out of which there was no carry and a hexadecimal F in each digit position out of which there was a carry during said third cycle of operation.

22. The apparatus of claim 21 wherein said third means further comprises:

said register file means responsive to said address signals and said first control signals and said third register means responsive to said first control signals for reading out said twelfth and said eleventh operands, respectively, during a tenth cycle of operation; and said register file means responsive to said address signals and said third control signals for storing said thirteenth operand wherein said thirteenth operand has a hexadecimal 9 in each digit position from which no carry resulted during the third cycle of operation and has a hexadecimal F in each digit position from which a carry resulted.

23. The apparatus of claim 22 wherein said fourth means comprises:
said register file means responsive to said address signals and said first control signals and said second register means responsive to said first control signals for reading out said thirteenth operand and said partial result during an eleventh cycle of operation;
said ALU means responsive to said second control signals for adding said partial result, said thirteenth operand and binary ONE to generate a final result; and
said register file means responsive to said third signals for storing said final result.

24. The apparatus of claim 13 whrein said arithmetic operation is an addition.

25. Apparatus for performing an arithmetic operation on binary coded decimal (BCD) operands comprising:
a control store for generating control signals, address signals and operands;
first means coupled to said control store and responsive to said control signals, said address signals and a first of said operands for converting each digit of a complement of a first BCD operand and each digit of a second BCD operand to a hexadecimal excess 3 digit to form a second operand and a third operand respectively;
second means coupled to said control store and said first means and responsive to said control signals and said address signals for adding corresponding hexadecimal excess 3 digits of said second and third operands and binary ONE to generate a partial result;
third means coupled to said control store and said first and said second means and responsive to said control signals and said address signals for generating a first hexadecimal digit value in each digit position from which a carry resulted from the addition of said second and said third operands and generating a second hexadecimal digit value in each digit position from which no carry resulted; and
fourth means coupled to said control store, said second means and said third means and responsive to said control signals and said address signals for adding said first and said second hexadecimal digit value to corresponding digit positions of said partial result and adding binary ONE to generate a final result.

26. The apparatus of claim 25 wherein said first means comprises:
a first register means coupled to said control store for storing said first operand having a value of hexadecimal CCCD; and
a microprocessor means including;
a register file means coupled to said control store and responsive to first control signals and said address signals for reading out said first BCD operand and said second BCD operand on a first cycle of operation and a second cycle of operation respectively;
an arithmetic logic unit (ALU) means coupled to said register file means, said control store and said first register means and responsive to second control signals for subtracting said first BCD operand plus binary ONE from hexadecimal CCCD during said first cycle of operation and subtracting hexadecimal CCCD from said second BCD operand during said second cycle of operation, thus generating said second operand and said third operand;
said register file means being coupled to said ALU means and responsive to third control signals and said address signals for storing said second operand on said first cycle of operation and said third operand on said second cycle of operation.

27. The binary apparatus of claim 26 wherein said second means comprises:
said register file means responsive to said first control signals and said address signals for reading out said second operand and said third operand during a third cycle of operation;
said ALU means responsive to said second control signals for adding said second operand, said third operand and binary ONE and generating said partial result; and
said microprocessor means further including a second register means coupled to said ALU means and responsive to said third control signal for storing said partial result.

28. The apparatus of claim 27 wherein said third means comprises;
said register file means responsive to said first control signals and said address signals for reading out said second operand and said third operand during a fourth cycle of operation;
said ALU means responsive to said second control signals for ORing said second and said third operands and generating a fourth operand; and
said register file means being responsive to said third control signals for storing said fourth operand wherein the 8-bit of each digit of said fourth operand indicates the possibility of a carry out of that digit position.

29. The apparatus of claim 28 wherein said third means further comprises:
second register means responsive to said first control signals for reading out said partial result during a fifth cycle of operation;
said ALU means responsive to said second signals for reading said partial result operand;
said microprocessor including shifter means coupled to said ALU means and said register file means and responsive to said third control signals for shifting said partial result one bit position left to generate a fifth operand; and
said register file means responsive to said third control signals and said address signals for storing said fifth operand thereby moving the 2-bit of each digit of said fifth operand in line with the 4-bit of each digit of said fourth operand.

30. The apparatus of claim 29 wherein said third means further comprises:
said register file means responsive to said address signals and said first means responsive to said first control signals for reading out said fifth operand and said partial result, respectively, during a sixth cycle of operation;

said ALU means responsive to said second control signals for ORing said partial result and said fifth operands and generating a sixth operand;

said shifter means responsive to said third control signals for shifting said sixth operand one bit position left and generating a seventh operand; and said register file means responsive to said address signals and said third control signals for storing said seventh operand wherein the 8-bit of each digit is at binary ONE if the 2-bit or the 4-bit of the corresponding digit positions of said partial result is at binary ONE.

31. The apparatus of claim 30 wherein said third means further comprises:

said register file means responsive to said address signals and said first control signals and said second register means responsive to said first control signals for reading out said seventh operand and said partial result during a seventh cycle of operation;

said ALU means responsive to said second signals for ANDing said partial result and said seventh operand and generating an eighth operand; and a third register means coupled to said ALU means and responsive to said third signals for storing said eighth operand, wherein the 8-bit of each digit of said eighth operand being binary ONE indicates that the corresponding partial result digit is greater than hexadecimal 9.

32. The apparatus of claim 31 wherein said third means further comprises:

said register file means responsive to said address signals and said first control signals and said third register means responsive to said first control signals for reading out said fourth and said eighth operands during an eighth cycle of operation;

said ALU means responsive to said second control signals for ANDing said fourth operand with the complement of said eighth operand to generate a ninth operand;

said shifter means responsive to said third control signals for shifting said ninth operand one bit position right to generate a tenth operand; and said register file means responsive to said address signals and said third control signals for storing said tenth operand wherein the four-bit of each digit position of said tenth operand being binary ONE indicates a carry out of the corresponding digit position during the third cycle of operation.

33. The apparatus of claim 32 wherein said third means further comprises:

said first register means storing hexadecimal BBBB for said control store;

said register file means responsive to said address signals and said first control signal for reading out said tenth operand during a ninth cycle of operation;

said ALU means responsive to said second control signals for ORing said tenth operand and hexadecimal BBBB to generate an eleventh operand;

said third register means responsive to said third control signals for storing said eleventh operand;

said shifter means responsive to said third control signals for shifting said eleventh operand one bit position right to generate a twelfth operand; and said register file means responsive to said address signals and said third control signals for storing said twelfth operand wherein said eleventh operand contains a hexadecimal B in each digit position out of which there was no carry and a hexadecimal F in each digit position out of which there was a carry during the third cycle of operation and said twelfth operand containing a hexadecimal D in each digit position out of which there was no carry and a hexadecimal F in each digit position out of which there was a carry during said third cycle of operation.

34. The apparatus of claim 33 wherein said third means further comprises:

said register file means responsive to said address signals and said first control signals and said third register means responsive to said first control signals for reading out said twelfth and said eleventh operands, respectively, during a tenth cycle of operation; and said register file means responsive to said address signals and said third control signals for storing said thirteenth operand wherein said thirteenth operand has a hexadecimal 9 in each digit position from which no carry resulted during the third cycle of operation and has a hexadecimal F in each digit position from which a carry resulted.

35. The apparatus of claim 34 wherein said fourth means comprises:

said register file means responsive to said address signals and said first control signals and said second register means responsive to said first control signals for reading out said thirteenth operand and said partial result during an eleventh cycle of operation;

said ALU means responsive to said second control signals for adding said partial result, said thirteenth operand and binary ONE to generate a final result; and said register file means responsive to said third signals for storing said final result.

36. The apparatus of claim 25 wherein said arithmetic operation is a subtraction.

* * * * *